US012115784B2

(12) United States Patent
Ueda et al.

(10) Patent No.: US 12,115,784 B2
(45) Date of Patent: Oct. 15, 2024

(54) LIQUID EJECTION APPARATUS

(71) Applicant: BROTHER KOGYO KABUSHIKI KAISHA, Nagoya (JP)

(72) Inventors: Toshiro Ueda, Inazawa (JP); Tatsuya Shindo, Nagoya (JP); Ryuji Horata, Gamagori (JP); Zenichiro Sasaki, Nagoya (JP); Kenta Horade, Tokai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 148 days.

(21) Appl. No.: 17/648,827

(22) Filed: Jan. 25, 2022

(65) Prior Publication Data

US 2022/0234344 A1 Jul. 28, 2022

(30) Foreign Application Priority Data

Jan. 27, 2021 (JP) ................................ 2021-010973

(51) Int. Cl.
*B41J 2/045* (2006.01)
*B41J 2/165* (2006.01)

(52) U.S. Cl.
CPC ......... *B41J 2/0451* (2013.01); *B41J 2/04541* (2013.01); *B41J 2/04563* (2013.01); *B41J 2/04581* (2013.01); *B41J 2/16523* (2013.01)

(58) Field of Classification Search
CPC .. B41J 2/0451; B41J 2/04581; B41J 2/16579; B41J 2/04563; B41J 2/04541; B41J 2/16517; B41J 29/38
See application file for complete search history.

(56) References Cited

U.S. PATENT DOCUMENTS

2007/0139461 A1 6/2007 Izuo
2014/0300657 A1 10/2014 Ike
2015/0097885 A1* 4/2015 Hosokawa ............ B41J 2/0451 347/10
2015/0352841 A1 12/2015 Horie
2016/0129693 A1 5/2016 Moriwaki et al.

FOREIGN PATENT DOCUMENTS

JP 2005-238159 A 9/2005
JP 2007-152889 A 6/2007
JP 2010-58463 A 3/2010
JP 2014-200982 A 10/2014

(Continued)

OTHER PUBLICATIONS

English Abstract of JP 2007-152889 A, dated Jun. 21, 2007.

(Continued)

*Primary Examiner* — Jannelle M Lebron
(74) *Attorney, Agent, or Firm* — Scully, Scott, Murphy & Presser, PC

(57) ABSTRACT

A liquid ejection apparatus includes a first circuit to output a determination signal indicating that ejecting ink is in failure, a second circuit to output a temperature signal indicating a temperature, a recovery device to perform a recovery operation, and a controller. The controller causes a recovery device to perform a first recovery operation based on a first failure-nozzle data in response to determining that a first temperature and a second temperature satisfy a predetermined condition.

13 Claims, 12 Drawing Sheets

(56) References Cited

FOREIGN PATENT DOCUMENTS

| | | | |
|---|---|---|---|
| JP | 2015-74140 | A | 4/2015 |
| JP | 2015-189158 | A | 11/2015 |
| JP | 2016-13685 | A | 1/2016 |
| JP | 2016-87976 | A | 5/2016 |
| JP | 2017-159536 | A | 9/2017 |
| JP | 6231759 | B2 | 11/2017 |
| JP | 4929699 | B2 | 5/2021 |
| JP | 2012-206396 | A | 10/2021 |

OTHER PUBLICATIONS

English Abstract of JP 2014-200982 A, dated Oct. 27, 2014.

Notice of Reasons for Refusal dated Jul. 30, 2024 received from the Japanese Patent Office in related JP 2021-010973 together with English language translation.

* cited by examiner

FIG. 8A

| TENPERATURE RANGE | DRIVE POTENTIAL |
|---|---|
| T3 ≤ T | V4 |
| T2 ≤ T < T3 | V3 |
| T1 ≤ T < T2 | V2 |
| T < T1 | V1 |

FIG. 8B

| NUMBER OF FAILURE NOZZLES | RECOVERY OPERATION |
|---|---|
| N3 ≤ N | STRONG PURGE |
| N2 ≤ N < N3 | MEDIUM PURGE |
| N1 ≤ N < N2 | WEAK PURGE |
| N < N1 | FLUSHING |

FIG. 12

| TENPERATURE RANGE | DRIVE WAVEFORM |
|---|---|
| T3 ≤ T | W4 |
| T2 ≤ T < T3 | W3 |
| T1 ≤ T < T2 | W2 |
| T < T1 | W1 |

LIQUID EJECTION APPARATUS

REFERENCE TO RELATED APPLICATIONS

This application claims priority from Japanese Patent Application No. 2021-10973 filed on Jan. 27, 2021. The entire content of the priority application is incorporated herein by reference.

BACKGROUND ART

There is known an ink jet printer having a function of inspecting whether or not ink droplets are normally ejected from a nozzle and determining a method for cleaning the nozzle based on the result of the inspection.

DETAILED DESCRIPTION

In such an ink jet printer, a viscosity change of ink in accordance with a temperature change may affect performance of ejecting ink droplets from the nozzle. Therefore, if, after the nozzle inspection, a considerable period of time elapses before cleaning, the temperature is likely to change within the period, and the determined cleaning method may not be appropriate.

According to the present disclosure, even when there is a temperature change in a period from the nozzle inspection to the nozzle cleaning, the nozzle is appropriately cleaned.

FIG. 8A shows a table in which the temperature range is associated with the drive potential.

FIG. 8B shows a table in which the number of failure nozzles is associated with the recovery operation.

FIG. 12 shows a table in which the temperature range is associated with the drive waveform in the fourth modification.

Hereinafter, an illustrative embodiment will be described with reference to the accompanying drawings.

General Configuration of Printer

Figure 1:
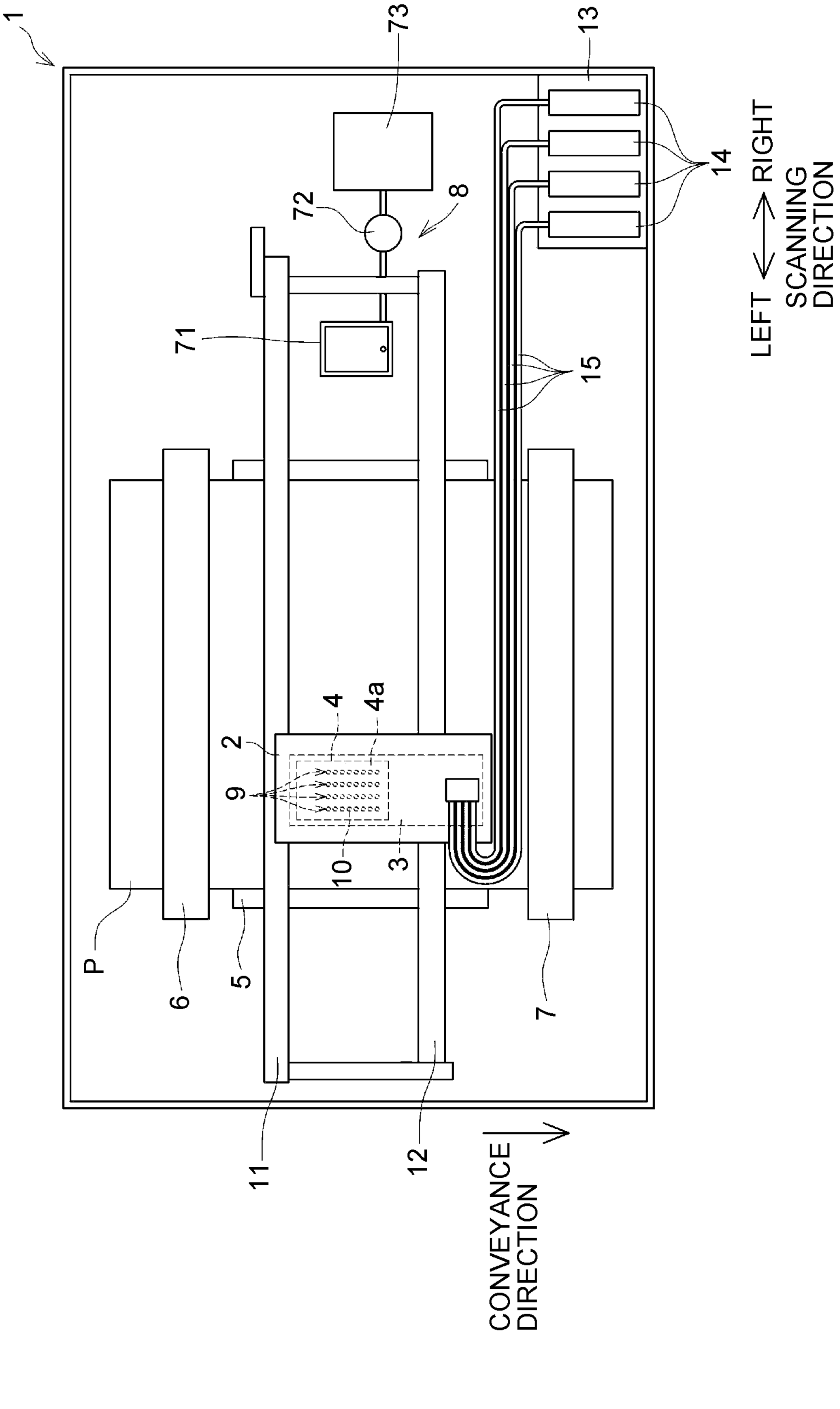
FIG. 1 is a schematic configuration of a printer.

As illustrated in FIG. 1, a printer 1 includes a carriage 2, a subtank 3, an inkjet head 4, a platen 5, a conveyance roller 6, a conveyance roller 7, and a maintenance unit 8.

The carriage 2 is supported by a guide rail 11 and a guide rail 12 each extending in a scanning direction. The carriage 2 is connected to a carriage motor 86 (refer to FIG. 6) via a belt. The carriage 2 is configured to, in response to the carriage motor 86 being driven, move in the scanning direction along the guide rails 11, 12. The scanning direction corresponds to a right-left direction as defined in FIG. 1.

The subtank 3 is mounted on the carriage 2. The printer 1 further includes a cartridge holder 13. The cartridge holder 13 is configured to accommodate four ink cartridges 14 that are attachable thereto and detachable therefrom. In the cartridge holder 13, the ink cartridges 14 are arranged next to each other in the scanning direction. The ink cartridges 14 store respective colored ink. Ink is an example of liquid. More specifically, the ink cartridges 14 store black ink, yellow ink, cyan ink, and magenta ink, respectively, in this order from the rightmost ink cartridge 14 in the scanning direction. The subtank 3 is connected, by respective corresponding tubes 15, to the ink cartridges 14 attached to the cartridge holder 13. Such a configuration may thus enable supply of ink of four colors to the subtank 3 from the respective ink cartridges 14.

The inkjet head 4 is mounted on the carriage 2 and is connected to a lower end portion of the subtank 3. The inkjet head 4 is supplied with ink of four colors from the subtank 3. The inkjet head 4 has a nozzle surface 4*a*. The nozzle surface 4*a* may be a lower surface of the inkjet head 4. The nozzle surface 4*a* has four nozzle rows 9 arranged next to each other in the scanning direction. The nozzle rows 9 include nozzles 10. More specifically, the nozzles 10 are arranged in rows extending in a conveyance direction orthogonal to the scanning direction to form the nozzle rows 9. The inkjet head 4 is configured to eject ink from the nozzles 10. In the inkjet head 4, black ink is ejected from the nozzles 10 belonging to the rightmost nozzle row 9 in the scanning direction. Yellow ink is ejected from the nozzles 10 belonging to the nozzle row 9 to the left of the black nozzle row 9. Cyan ink is ejected from the nozzles 10 belonging to the nozzle row 9 to the left of the yellow nozzle row 9. Magenta ink is ejected from the nozzles 10 belonging to the nozzle row 9 to the left of the cyan nozzle row 9.

The platen 5 is disposed below the inkjet head 4 and faces the nozzles 10. The platen 5 extends in the scanning direction and has a dimension corresponding to the entire width of a sheet P to be conveyed. The platen 5 is configured to support from below a sheet P being conveyed. The sheet P is an example of a recording medium. The conveyance roller 6 is disposed upstream from the inkjet head 4 and the platen 5 in the conveyance direction. The conveyance roller 7 is disposed downstream from the inkjet head 4 and the platen 5 in the conveyance direction. The conveyance rollers 6, 7 are connected to a conveyance motor 87 (refer to FIG. 6) via gears. The conveyance rollers 6, 7 are configured to, in response to the conveyance motor 87 being driven, rotate to convey a sheet P in the conveyance direction.

The maintenance unit 8 includes a cap 71, a suction pump 72, and a waste liquid tank 73. The cap 71 is disposed to the right of the platen 5 in the scanning direction. When the carriage 2 is located at a maintenance position, the nozzles 10 face the cap 71. The maintenance position is further to the right than the platen 5 in the scanning direction.

Figure 6:
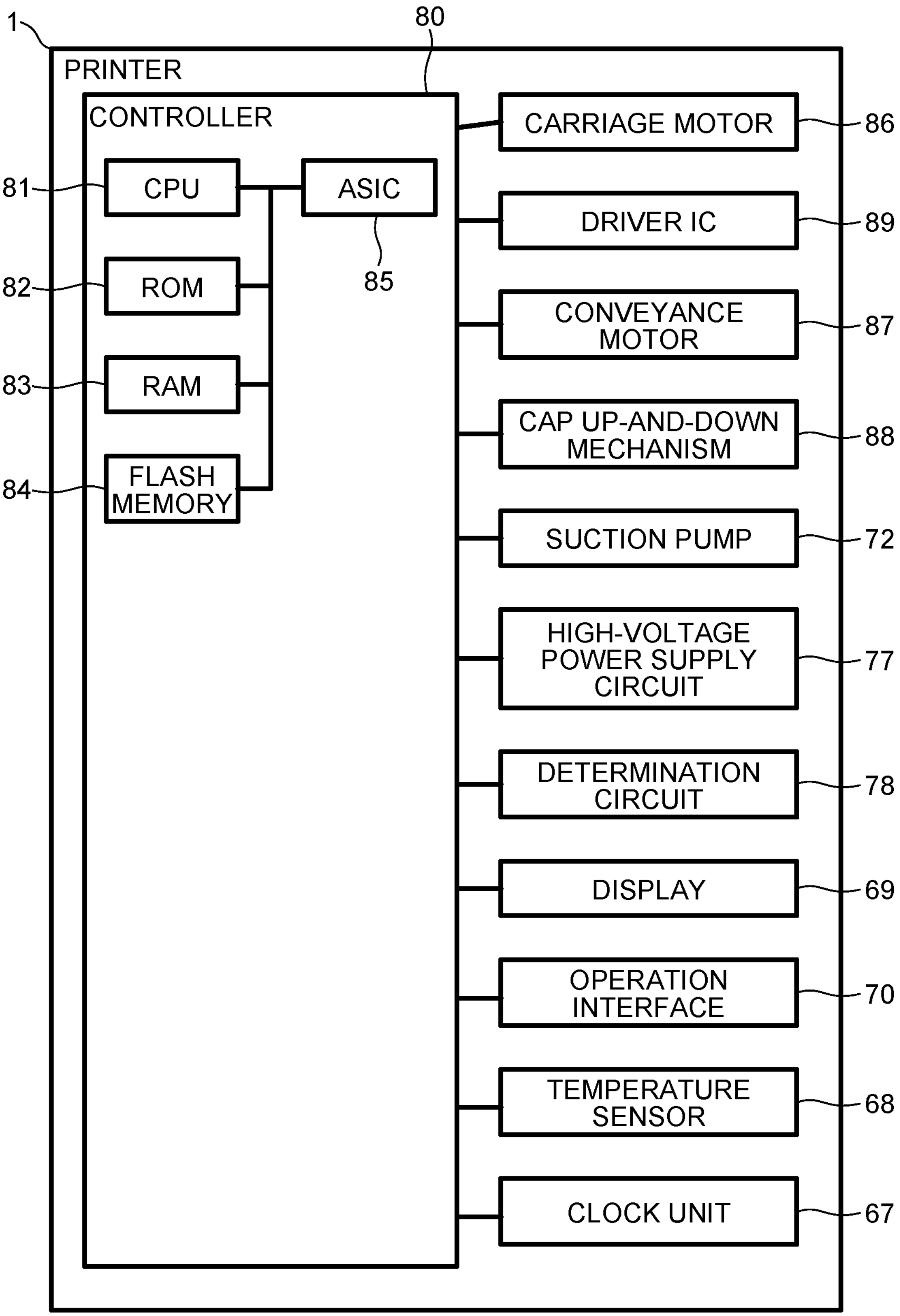
FIG. 6 is a block diagram showing the electrical configuration of the printer.

The cap 71 is movable upward and downward selectively by control of a cap up-and-down mechanism 88 (refer to FIG. 6). The cap up-and-down mechanism 88 may have a similar configuration to a known cap up-and-down mechanism. The description of the cap up-and-down mechanism in JP2012-206396A is incorporated herein by reference. In a state where the nozzles 10 and the cap 71 face each other when the carriage 2 is located at the maintenance position, the cap up-and-down mechanism 88 moves the cap 71 upward. As the cap 71 moves upward, an upper end portion of the cap 71 intimately contacts the nozzle surface 4$a$ of the inkjet head 4 to cover the nozzles 10. The cap 71 may not be limited to have such a configuration to intimately contact the nozzle surface 4$a$ to cover the nozzles 10. Alternatively, the cap 71 may intimately contact a frame surrounding the nozzle surface 4$a$ of the inkjet head 4 to cover the nozzles 10.

The suction pump 72 may be a peristaltic pump. In this case, the suction pump 72 is connected to both the cap 71 and the waste liquid tank 73. With this configuration, the maintenance unit 8 may perform a suction purge. In a suction purge, in response to the suction pump 72 being driven in a state where the cap 71 covers the nozzles 10, ink is sucked from the nozzles 10 of the inkjet head 4 by the suction pump 72. The suction purge is an example of a second recovery operation. Ink discharged from the inkjet head 4 by the suction purge is stored in the waste liquid tank 73.

In the present embodiment, one of three types of suction purge, i.e., weak purge, medium purge, and strong purge, may be selectively performed. In the medium purge, more ink is discharged than in the weak purge. In the strong purge, more ink is discharged than in the medium purge. By adjusting either or both of the driving time and the driving speed of the suction pump 72, one of the weak purge, the medium purge and strong purge may be selectively performed.

For the sake of convenience, in the illustrative embodiment, the cap 71 covers all the nozzles 10 of the inkjet head 4 and ink is discharged from the inkjet head 4 through each nozzle 10 in a suction purge. Nevertheless, in other embodiments, the cap 71 may include a first capping portion and a second capping portion, each of which may cover corresponding nozzles 10 of the inkjet head 4. The first capping portion may cover the nozzles 10 belonging to the rightmost nozzle row 9 from which black ink is ejected, and the second capping portion may cover the nozzles 10 belonging to the remaining nozzle rows 9 from which respective color inks (e.g., yellow, cyan, and magenta inks) are ejected. In this case, the cap up-and-down mechanism 88 may include a switching valve. In a suction purge, the cap up-and-down mechanism 88 may move the first capping portion and the second capping portion simultaneously to cover the respective corresponding nozzles 10. A destination with which the suction pump 72 is communicated may be switched between the first capping portion and the second capping portion by the switching valve. Such a configuration may enable the suction pump 72 to communicate with the first capping portion or the second capping portion of the cap 71 as appropriate, thereby discharging black ink and color inks selectively from the inkjet head 4. Alternatively, the maintenance unit 8 may include a cap 71 and a cap up-and-down mechanism 88 for each nozzle row 9. Such a configuration may enable ink to be discharged from the nozzles 10 of the inkjet head 4 on a nozzle row 9 basis.

Figure 2:
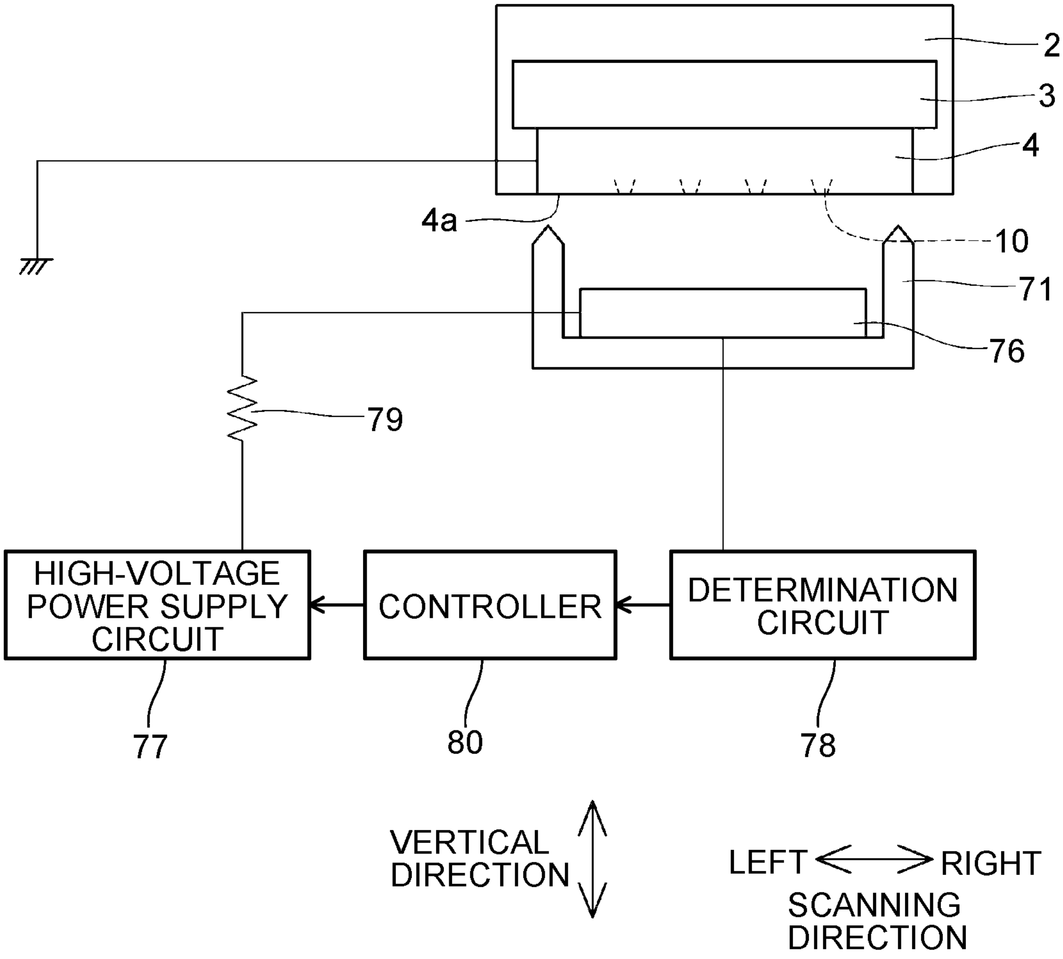
FIG. 2 shows a detection electrode disposed in the cap and a connection between the detection electrode and the high-voltage power supply circuit and the determination circuit.

As illustrated in FIG. 2, a detection electrode 76 is disposed in the cap 71. The detection electrode 76 has a flat rectangular shape. The detection electrode 76 is connected to a high-voltage power supply circuit 77 via a resistor 79. In ejection determination, the high-voltage power supply circuit 77 applies a certain positive potential (e.g., approximately 600 V) to the detection electrode 76. The inkjet head 4 is maintained at a ground potential. Thus, a certain potential difference is caused between the inkjet head 4 and the detection electrode 76. A determination circuit 78 is connected to the detection electrode 76. The determination circuit 78 compares a potential indicated by a signal received from the detection electrode 76 with a threshold potential Vt, and outputs a determination signal responsive to the comparison result.

Figure 3A:
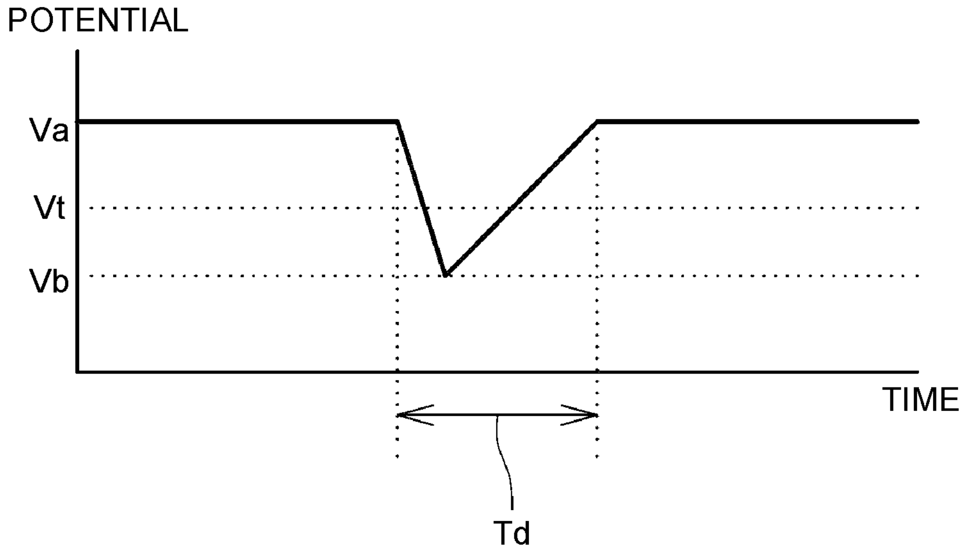
FIG. 3A shows a change in the potential of the detection electrode when ink is ejected from the nozzle.

More specifically, in ejection determination, a certain potential difference is caused between the inkjet head 4 and the detection electrode 76. Thus, when the inkjet head 4 ejects ink from a target nozzle 10, the ejected ink gets electrically charged. In a state where the carriage 2 is positioned at the maintenance position, the inkjet head 4 is driven in a check mode for ejecting ink from each nozzle 10. Thus, in a case where ink is normally ejected from a particular target nozzle 10 toward the detection electrode 76, as shown in FIG. 3A, as the charged ink approaches the detection electrode 76, the potential at the detection electrode 76 decreases from the potential Va until the charged ink reaches the detection electrode 76. When the ink reaches the detection electrode 76, the potential at the detection electrode 76 reaches the potential Vb that is lower than the threshold potential Vt. After the charged ink reaches the detection electrode 76, the potential at the detection electrode 76 gradually increases to the potential Va from the potential Vb. That is, the potential at the detection electrode 76 changes in the driving period Td of the inkjet head 4. In a case where the potential at the detection electrode 76 exceeds the threshold potential Vt in the driving period Td, it is determined that ink has been normally ejected from the target nozzle 10 and thus that the target nozzle 10 is not a failure nozzle.

Figure 3B:
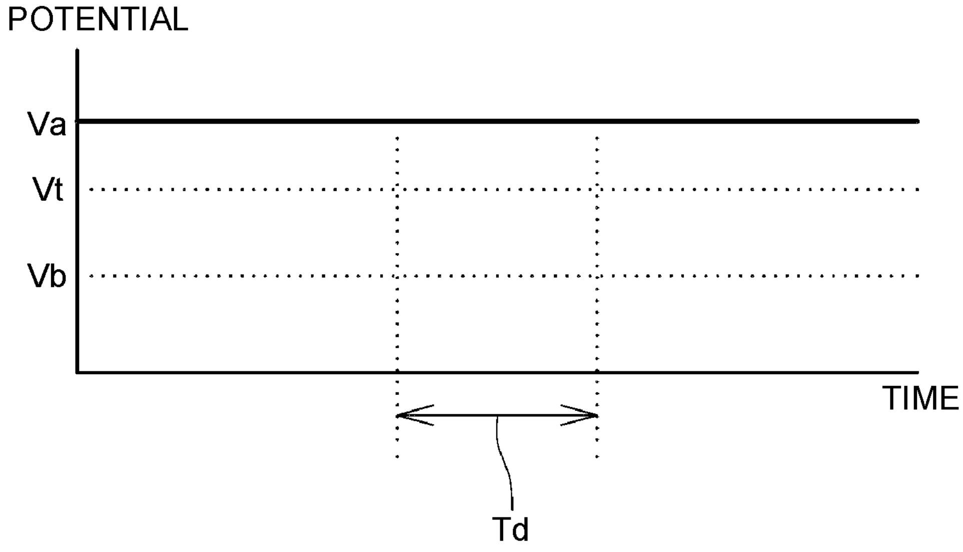
FIG. 3B shows a change in the potential of the detection electrode when ink is not ejected from the nozzle.

In a case where ink is not ejected from the particular target nozzle 10 although the inkjet head 4 is driven in the check mode, no ink is between the inkjet head 4 and the detection electrode 76. Thus, as shown in FIG. 3B, the potential at the detection electrode 76 is maintained almost constant at the potential Va in the driving period Td of the inkjet head 4. That is, the potential at the detection electrode 76 does not exceed the threshold potential Vt in the driving period Td of the inkjet head 4. In this case, it is determined that ink has not been normally ejected from the target nozzle 10 and thus that the target nozzle 10 is a failure nozzle.

In the illustrative embodiment, a positive potential is applied to the detection electrode 76 by the high-voltage power supply circuit 77. Nevertheless, in other embodiments, a negative potential (e.g., approximately −600 V) may be applied to the detection electrode 76 by the high-voltage power supply circuit 77. In such a case, in a state where the carriage 2 is positioned at the maintenance position, the inkjet head 4 may be driven in the check mode. In response to this, in a case where ink is normally ejected from a particular target nozzle 10 toward the detection electrode 76, as the charged ink approaches the detection electrode 76, the potential at the detection electrode 76 may increase from the potential Va by exceeding a threshold potential Vt until the charged ink reaches the detection electrode 76. When the charged ink reaches the detection electrode 76, the potential at the detection electrode 76 reaches a particular peak potential. After the charged ink reaches the detection electrode 76, the potential at the detection electrode 76 may gradually decrease to the potential Va from the particular peak potential.

Inkjet Head

Figure 4:
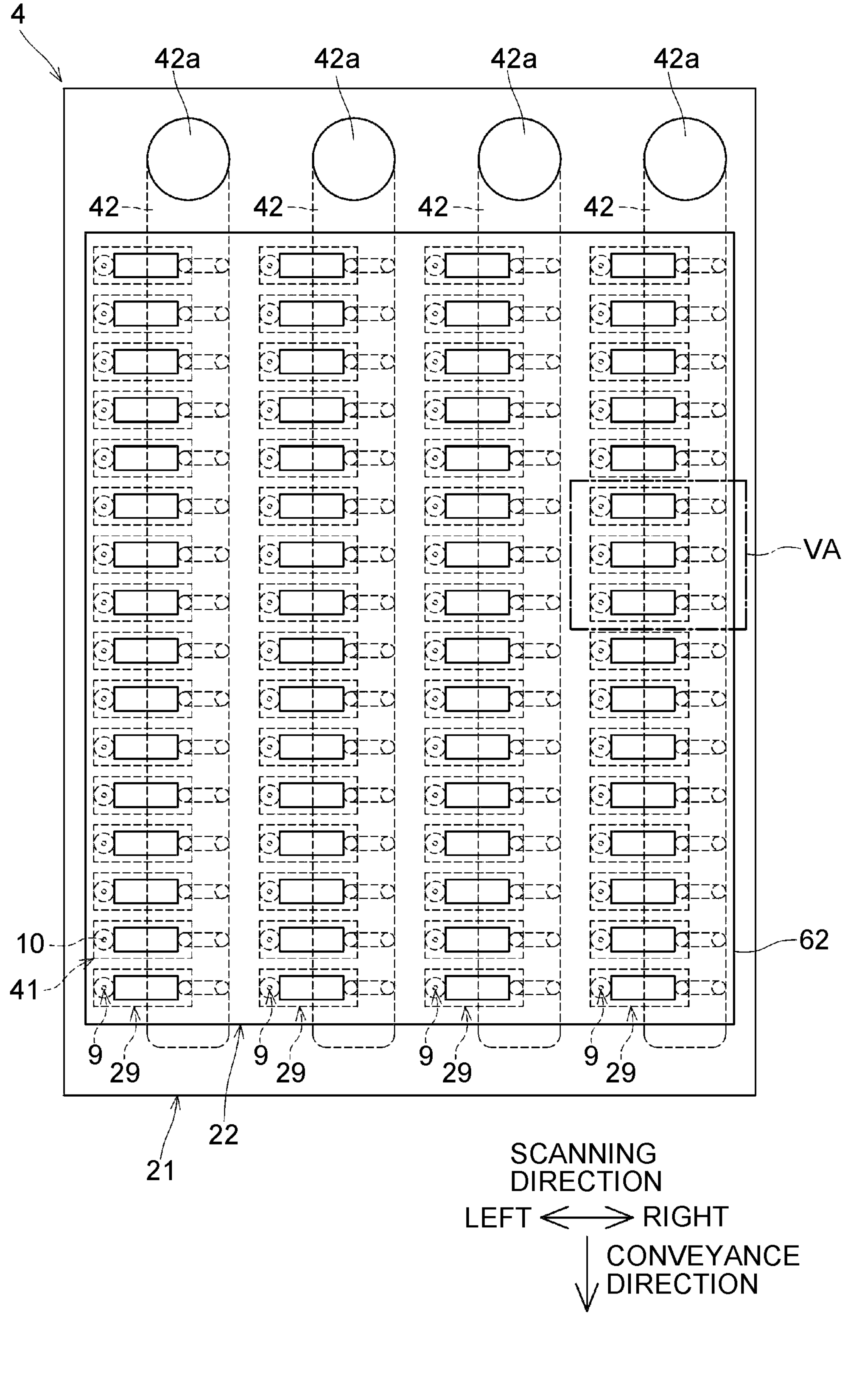
FIG. 4 is a plan view of the ink jet head.
Figure 5A:
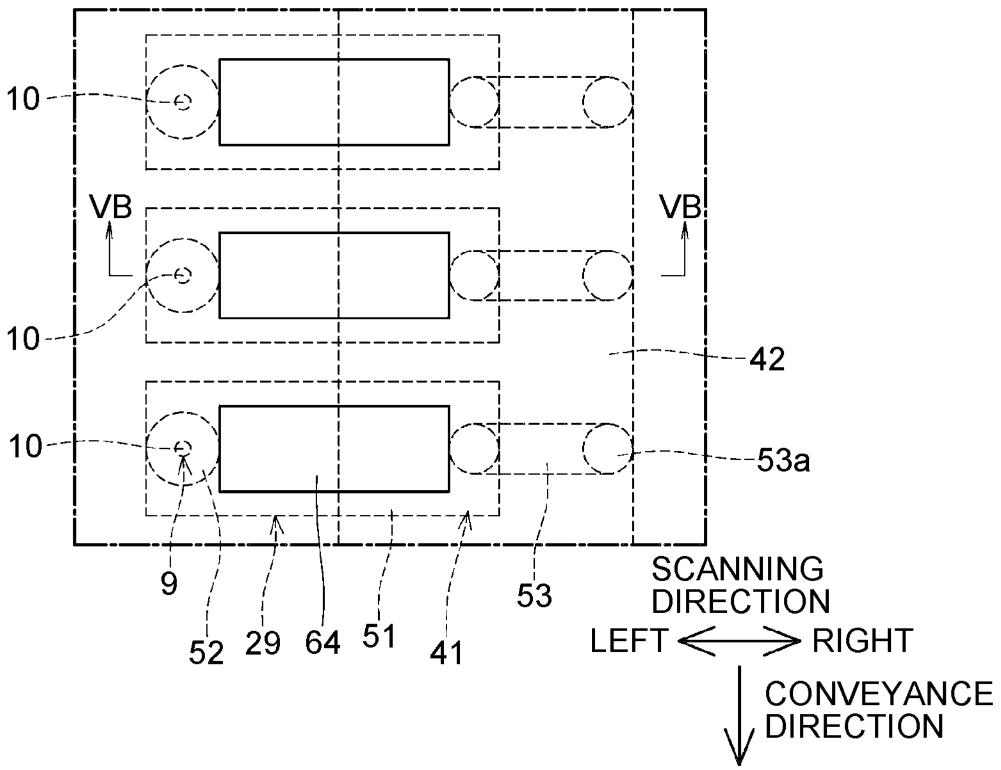
FIG. 5A is an enlarged view of the VA portion of FIG. 4.
Figure 5B:
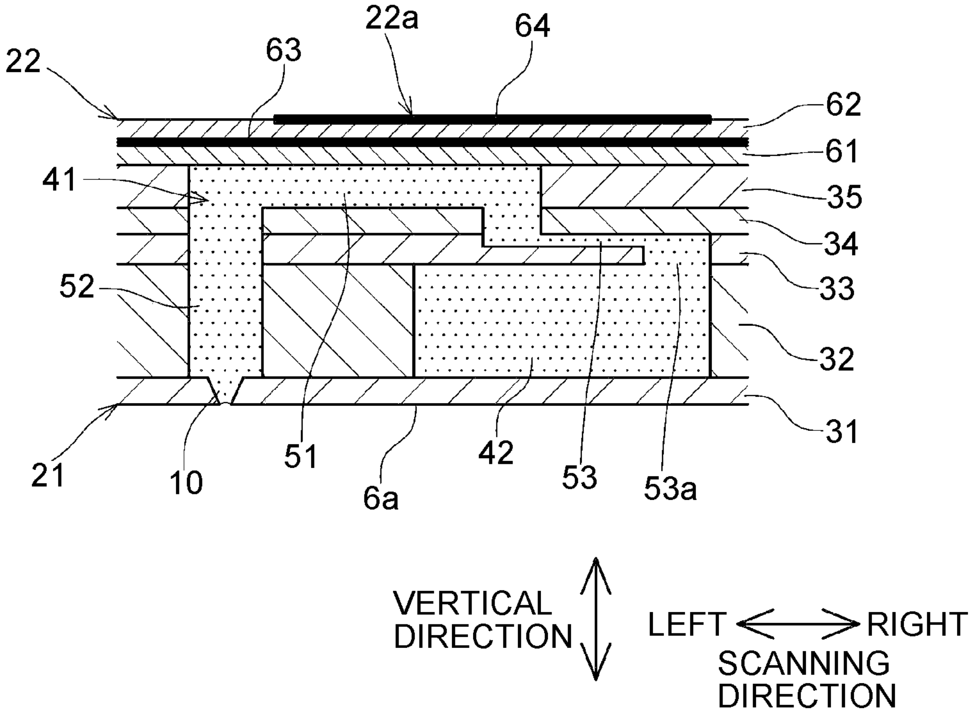
FIG. 5B is a cross-sectional view taken along a line VB-VB of FIG. 5A.

Next, a configuration of the inkjet head 4 will be described in detail. As illustrated in FIGS. 4, 5A, and 5B, the inkjet head 4 includes a channel unit 21 and a piezoelectric actuator 22.

The channel unit 21 includes plates 31, 32, 33, 34, and 35. The plate 31 may be a bottom plate of the channel unit 21. The plate 32 is disposed above the plate 31. The plate 33 is disposed above the plate 32. The plate 34 is disposed above the plate 33. The plate 35 is disposed above the plate 34. The channel unit 21 includes individual channels 41 and four common channels 42.

The individual channels 41 are arranged in rows in the conveyance direction so as to form four individual channel rows 29 for the four nozzle rows 9. That is, the channel unit 21 includes the individual channel rows 21 arranged next to each other in the scanning direction.

Each individual channel 41 includes a nozzle 10, a pressure chamber 51, a descender 52, and a restrictor channel 53. In each individual channel 41, a nozzle 10 and a left end portion of a pressure chamber 51 in the scanning direction are connected to each other via a descender 52 such that the nozzle 10 and the pressure chamber 51 are in communication with each other. A restrictor channel 53 is connected to a right end portion of the pressure chamber 51 in the scanning direction such that the restrictor channel 53 and the pressure chamber 51 are in communication with each other. Configurations of the nozzle 10, the pressure chamber 51, the descender 52, and the restrictor channel 53 and positional relationships therebetween are known by a person ordinary skilled in the art. Therefore, a detailed description thereof will be omitted.

The four common channels 42 are disposed at respective positions corresponding to the four individual channel rows 29. Each common channel 42 extends in the conveyance direction and overlaps, in the vertical direction, right end portions of corresponding individual channels 41 belonging to the corresponding individual channel rows 29. Each common channel 42 is connected to right end portions of corresponding restrictor channels 53 so that the common channel 42 and the corresponding restrictor channels 53 are in communication with each other. The restrictor channels 53 constitute the corresponding individual channels 41. Each common channel 42 is configured to receive ink supplied thereto via an inlet 42*a* defined at an upstream end portion of the channel unit 21 in the conveyance direction.

The piezoelectric actuator 22 includes a diaphragm 61, a piezoelectric layer 62, a common electrode 63, and individual electrodes 64. The diaphragm 61 may be made of a piezoelectric material containing lead zirconate titanate, a main component of which is a mixed crystal of lead titanate and lead zirconate. The diaphragm 61 is disposed on an upper surface of the plate 35 that may be one of the plates 31 to 35 constituting the channel unit 21, and covers the pressure chambers 51. The piezoelectric layer 62 is made of the same piezoelectric material used for the diaphragm 61. The piezoelectric layer 62 is disposed on an upper surface of the diaphragm 61 and continuously extends over the pressure chambers 51. In the illustrative embodiment, the diaphragm 61 and the piezoelectric layer 62 are both made of a piezoelectric material. Nevertheless, in other embodiments, the diaphragm 61 may be made of an insulating material, such as a synthetic resin material, other than the piezoelectric material.

The common electrode 63 is disposed between the diaphragm 61 and the piezoelectric layer 62 and extends therebetween in an entire range within which the common electrode 63 and the diaphragm 61 extend. The common electrode 63 is connected to a power supply via a wiring and is maintained at a ground potential. The individual electrodes 64 are disposed on an upper surface of the piezoelectric layer 62. The individual electrodes 64 are in a one-to-one relationship with the pressure chambers 51. Each individual electrode 64 overlaps a central portion of a corresponding pressure chamber 51 in the vertical direction. Each individual electrode 64 is connected to a driver IC 89 (refer to FIG. 6) via a wiring. The ground potential or a drive potential (e.g., approximately 20 V to 30 V) is selectively applied to each individual electrode 64 from the driver IC 89. A portion of the piezoelectric layer 62 sandwiched between a particular portion of the common electrode 63 and an individual electrode 64 is polarized in a thickness direction of the piezoelectric layer 62. Such polarized portions are provided corresponding to the arrangement of the common electrode 63 and the individual electrodes 64.

The piezoelectric actuator 22 has particular portions that serve as drive elements 22*a* for applying pressure to ink in the respective pressure chambers 51. Each drive element 22*a* includes a portion of the diaphragm 61, a portion of the piezoelectric layer 62, a portion of the common electrode 63, and an individual electrode 64. The portions of the diaphragm 61, the piezoelectric layer 62, and the common electrode 63, and the individual electrode 64 overlap a pressure chamber 51 in the vertical direction. In response to the driver IC 89 switching the potential at a target individual electrode 64 between the ground potential and the drive potential, the potential difference occurring between the target individual electrode 64 and the common electrode 63 is changed. This change causes deformation in the piezoelectric layer 62 and the diaphragm 61. Thus, the pressure chamber 51 changes in its shape and thus the pressure applied to ink in the pressure chamber 51 changes, whereby ink is ejected from the nozzle 10 being in communication with the pressure chamber 51.

Electrical Configuration of Printer

Hereinafter, a description will be provided on an electrical configuration of the printer 1. As illustrated FIG. 6, the printer 1 includes a controller 80. The controller 80 includes a CPU 81, a ROM 82, a RAM 83, a flash memory 84, and an ASIC 85. The controller 80 is configured to control operations of the carriage motor 86, the inkjet head 4, the conveyance motor 87, the cap up-and-down mechanism 88, the suction pump 72, the high-voltage power supply circuit 77, and the driver IC 89. In the illustrative embodiment, the controller 80 is configured to control the driver IC 89 to control driving of the inkjet head 4. The controller 80 is configured to receive a determination signal from the determination circuit 78.

The printer 1 further includes a display 69, an operation interface 70, a temperature sensor 68, and a clock unit 67. The operation interface 70 is an example of an inputting device. The display 69 may be a liquid crystal display disposed at a housing of the printer 1. The controller 80 is configured to control the display 69 to display information necessary for operating the printer 1. The operation interface 70 includes buttons disposed at the housing of the printer 1 and a touch screen of the display 69. In response to a user operating the operation interface 70, a particular signal is input to the controller 80 from the operation interface 70.

The temperature sensor 68 is configured to detect a temperature of the environment where the printer 1 is placed and to output a temperature signal indicating the temperature. The controller 80 is configured to receive the temperature signal from the temperature sensor 68. The clock unit 67 is configured to count the time and output a time signal indicating the current time. The control unit 80 is configured to receive the time signal from the clock unit 67.

In the controller 80, only one of the CPU 81 or the ASIC 85 may perform all processing or a combination of the CPU 81 and the ASIC 85 may perform all processing. Alternatively, the controller 80 may include a single CPU 81 that may perform all processing or include a plurality of CPUs 81 that may share all processing. Alternatively, the controller 80 may include a single ASIC 85 that may perform all processing or include a plurality of ASICs 85 that may share all processing.

As shown in FIG. 8A, the flash memory 84 stores a table in which a temperature range of the temperature T indicated by the temperature signal received from the temperature sensor 68 is associated with a drive potential to be applied to the individual electrode 64. As shown in FIG. 8A, the drive voltage is V4 when T3≤T. The drive voltage is V3 when T2≤T<T3. The drive voltage is V2 when T1≤T<T2. The drive voltage is V1 when T<T1. T1, T2, and T3 satisfy the inequality of T1<T2<T3. V1, V2, V3, and V4 satisfy the inequality of V4<V3<V2<V1.

As shown in FIG. 8B, the flash memory 84 stores a table in which the number N of failure nozzles is associated with a recovery operation. As shown in FIG. 8B, the recovery operation is the strong purge when N3≤N. The recovery operation is the medium purge when N2≤N<N3. The recovery operation is the weak purge when N1≤N<N2. The recovery operation is a flushing when N<N1. N1, N2, and N3 satisfy the inequality of N1<N2<N3. The flushing is an operation in which the driver IC 89 is controlled to drive the individual electrodes 64 corresponding to the nozzles 10 in order to discharge ink from the nozzles 10. The amount of ink discharged by the flushing is less than the amount of ink discharged by the weak purge.

Control of Printer by Controller

The control of the printer 1 by the controller 80 will be described. The controller 80 controls the operation of the printer 1 by performing processing along the flowchart in FIG. 7.

The controller 80 waits while the controller 80 does not receive a recording command (S101: NO) instructing recording on the recording sheet P and the time indicated by the time signal received from the clock unit 67 is not a predetermined time that is set in advance (S102: NO).

When the recording command is received (S101: YES), the controller 80 sets a drive potential to be applied to the individual electrode 64 (S103). In S103, the controller 80 sets the drive potential to one of V1, V2, V3, and V4 according to the table shown in FIG. 8A based on the temperature T indicated by the temperature signal received from the temperature sensor 68.

Then, the controller 80 executes a recording process (S104). In S104, the controller 80 repeats a recording operation in which the inkjet head 4 ejects ink from the nozzles 10 toward the recording sheet P and a conveying operation in which the recording sheet P is conveyed by a predetermined amount to the conveyance rollers 6, 7. In the recording operation, the controller 80 controls the carriage motor 86 to move the carriage 2 in the scanning direction, and the driver IC89 to switch the potential to be applied to the individual electrode 64 between the ground potential and the drive potential that is set in S103. In the conveying operation, the controller 80 controls the conveyance motor 87 to rotate the conveyance rollers 6, 7.

When the current time indicated by the time signal received from the clock unit 67 is a predetermined time set in advance (S102: YES), the controller 80 executes check mode driving (S105) for checking whether or not a failure has occurred in each of the nozzles 10. In the check mode driving, the controller 80 drives the inkjet head 4 in a state where the carriage 2 is in the maintenance position to eject ink sequentially from each of the nozzles 10 toward the detection electrode 76. The controller 80 receives a determination signal from the determination circuit 78 for each of the nozzles 10.

If all of the received determination signals indicate that no failure has occurred (S106: NO), the process proceeds to S101. If the received determination signal indicates that a failure has occurred (S106: YES), the controller 80 stores first failure-nozzle data and first temperature data in the flash memory 84 (S107). The first failure-nozzle data identifies the nozzle 10, i.e., a failure nozzle, in which a failure has occurred, and includes the number N of the failure nozzles, based on the determination signals received during the check mode driving. The first temperature data is based on the temperature signal received from the temperature sensor 68 during the check mode driving, and indicates a first temperature. The first temperature data may be about the temperature itself indicated by the temperature signal. The first temperature data may alternatively indicate that the temperature indicated by the temperature signal is included in one of the temperature ranges in FIG. 8A.

Then, the controller 80 waits until receiving the recording command (S108: NO). When the controller 80 receives the recording command (S108: YES), the controller 80 determines whether or not the temperature at a timing of receiving the recording command is in the temperature range at a timing of the check mode driving (S109). In S109, the controller 80 determines which temperature range defined in the table in FIG. 8A includes the temperature T, i.e., second temperature, indicated by the temperature signal received from the temperature sensor 68. Then, in S109, the controller 80 determines whether the first temperature and the temperature T satisfies a predetermined condition. That is, the controller 80 determines whether or not the determined temperature range matches the temperature range indicated by the first temperature data stored in the flash memory 84.

If the controller 80 determines in S109 that the determined temperature range matches the temperature range indicated by the first temperature data (S109: YES), that is, the controller 80 determines that the first temperature and the temperature T satisfies a predetermined condition, the controller 80 reads out the first failure-nozzle data stored in the flash memory 84 in S107, refers to the table in FIG. 8B based on the number N of failure nozzles included in the first failure-nozzle data, and sets a recovery operation (S110).

In this embodiment, the maintenance unit 8 for performing suction purge and the inkjet head 4 for performing flushing correspond to the "recovery device".

If the controller 80 determines in S109 that the determined temperature range does not match the temperature range indicated by the first temperature data (S109: NO), that is, the controller 80 determines whether the first temperature and the temperature T does not satisfy a predetermined condition, the controller 80 executes the check mode driving process as done in S105 (S111). In S111, the controller 80 executes the check mode driving for checking whether or not a failure has occurred in each nozzle 10. In the check mode driving, the controller 80 drives the inkjet head 4 in a state where the carriage 2 is in the maintenance position to eject ink sequentially from each of the nozzles 10 toward the detection electrode 76. The controller 80 receives a determination signal from the determination circuit 78 for each of the nozzles 10.

The controller 80 obtains second failure-nozzle data on the basis of the determination signal. The second failure-nozzle data identifies the nozzle 10, i.e., a failure nozzle, in which the failure has occurred, and includes the number N of the failure nozzles, on the basis of the determination signal received during the check mode driving.

The controller 80 sets a recovery operation on the basis of the number N of failure nozzles included in the second failure-nozzle data and the table in FIG. 8B (S112).

The controller 80 executes the recovery operation set in S110 or S112 (S113). After the recovery operation is executed, the drive potential applied to the drive electrode 64 is set in S103, and the recording process is executed in S104.

Effects

If a large temperature change occurs after driving in the check mode until when the recovery operation is performed, the condition of the failure nozzle may change. In the present embodiment, first failure-nozzle data and first temperature data obtained during the check mode driving are stored in the flash memory 84. When the temperature T during the recovery operation is in the temperature range during the check mode driving, the recovery operation is set based on the first failure-nozzle data and the recovery operation is executed. In other words, it is not necessary to execute the check mode driving immediately before the recovery operation so the recovery operation is quickly completed.

When the temperature at the recovery operation is not in the temperature range at the check mode driving, the check mode driving is performed again to obtain the second failure-nozzle data. Then, the recovery operation is set on the basis of the obtained second failure-nozzle data, and the recovery operation is performed. If, after the check mode driving, a large temperature change occurs before the recovery operation, the recovery operation suitable for the nozzle condition is performed on the basis of the second failure-nozzle data obtained by the check mode driving immediately before the recovery operation.

The temperature range and the drive potential are associated with each other in accordance with the relationship between the temperature of the ink and the viscosity of the ink, in the inkjet head 4. In the present embodiment, prior to executing the recovery operation, it is determined whether or not the current temperature is in the temperature range at the check mode driving. When the temperature changes largely since the check mode driving, the viscosity of the ink may also change largely such that the drive potential needs to be changed. Because either the recovery operation based on the first failure-nozzle data or the recovery operation based on the second failure-nozzle data is performed according to the temperature change, the nozzle condition can be appropriately recovered.

In the present embodiment, the check mode driving is executed when the time indicated by the clock signal from the clock unit 67 is a predetermined time set in advance. For example, it may be preferable to execute the check mode driving while setting the predetermined time in a period when it is unlikely that a user uses the printer 1, to avoid disturbing the recording process in the printer 1.

As a result of the check mode driving, it may be allowed to immediately execute the recovery operation when a failure has occurred in the nozzle 10. If, after the check mode driving, a period until receiving recording command is long, the viscosity of the ink in the inkjet head 4 may increase or decrease during the period. In this case, it is necessary to execute the recovery operation again when receiving the recording command, thereby increasing the consumption of the ink.

In the present embodiment, after the check mode driving, the recovery operation is performed using the reception of the recording command as a trigger. Therefore, since the recovery operation is performed immediately before the recording process, only an amount of ink necessary for recovering the nozzle condition is consumed regardless of the length of the period from the check mode driving to the reception of the recording command.

In the present embodiment, one of flushing, weak purge, medium purge, and strong purge is selectively performed according to the number of failure nozzles, so that the nozzle condition is appropriately recovered.

Modifications

The present invention may not be limited to the above-described embodiments, and various modifications may be made within the scope of the claims.

Figure 7:
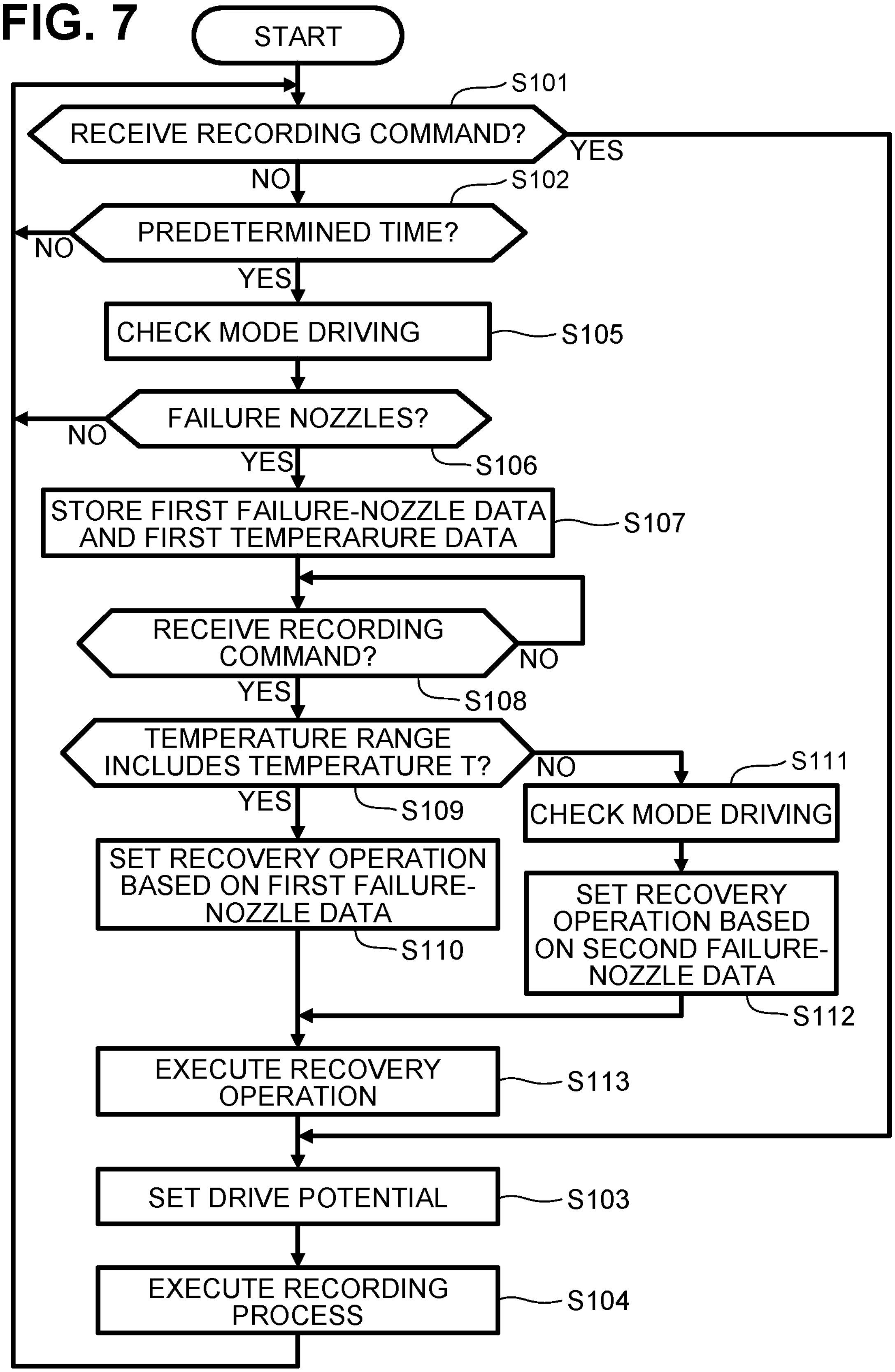
FIG. 7 is a flowchart showing the processing by the controller.
Figure 9:
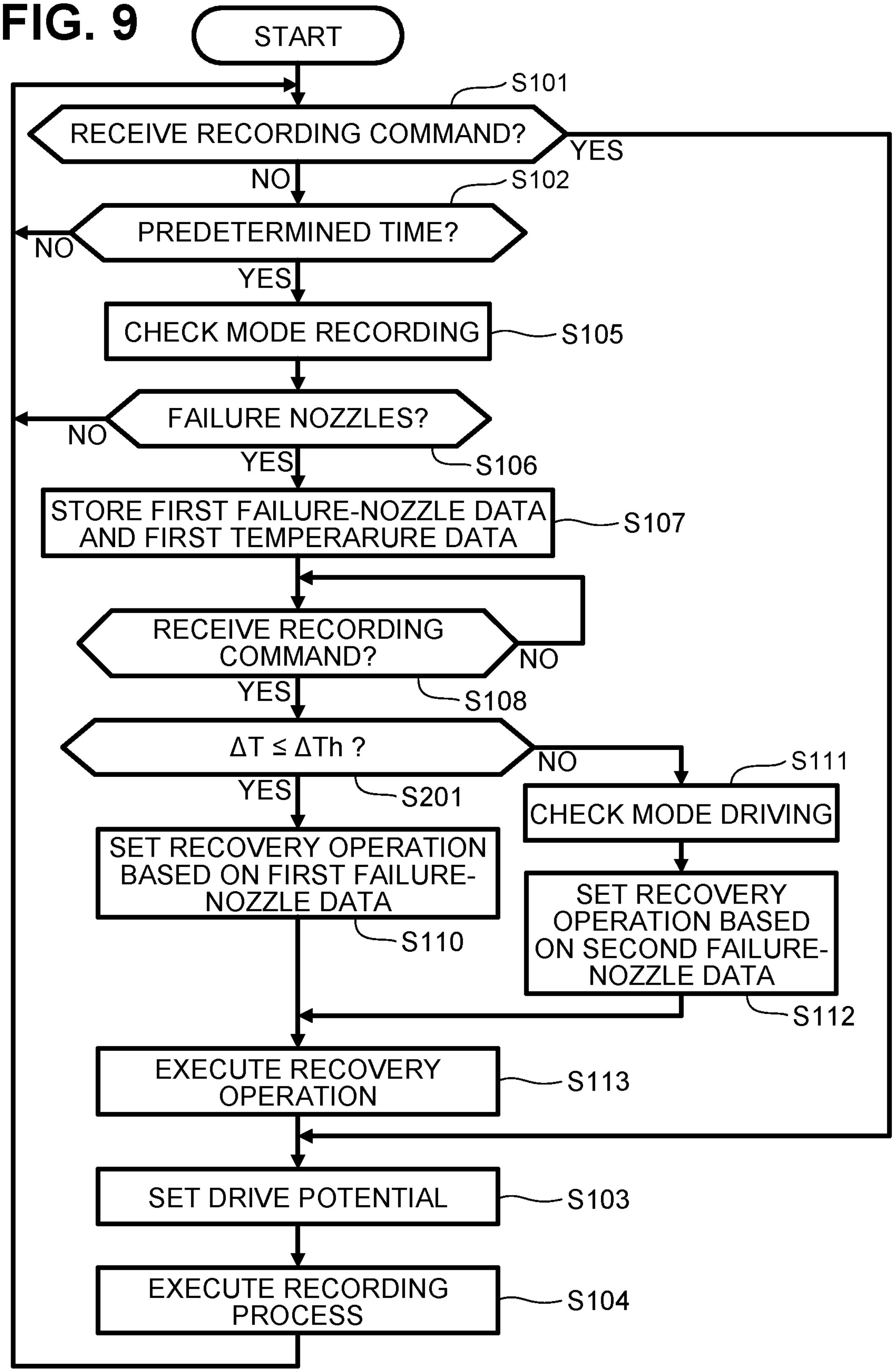
FIG. 9 is a flowchart showing processing by the controller according to the first modification.

The controller 80 of the first modification performs processing to control the printer 1 according to a flowchart of FIG. 9. In the flowchart of FIG. 9, S109 in the flowchart of FIG. 7 is replaced by S201. In the flowchart of FIG. 9, the first temperature data stored in the flash memory 84 in S107 is a numerical value of the temperature indicated by the temperature signal received from the temperature sensor 68.

When the controller 80 receives the recording command (S108: YES), the controller 80 determines whether the temperature difference ΔT between the temperature T indicated by the temperature signal received from the temperature sensor 68 and the temperature indicated by the first temperature data stored in the flash memory 84 in S107 is equal to or less than the threshold value ΔTh (S201). That is, the controller 80 determines whether the first temperature and the temperature T satisfies a predetermined condition.

If the temperature difference ΔT is less than or equal to the threshold value ΔTh (S201: YES), the process proceeds to S110. If the temperature difference ΔT is greater than the threshold value ΔTh (S201: NO), the process proceeds to S111.

If a large temperature change occurs after driving in the check mode until when the recovery operation is performed, the condition of the failure nozzle may change. In the first modification, first failure-nozzle data and first temperature data obtained during the check mode driving are stored in the flash memory 84. The first temperature data is a numerical value of the temperature indicated by the temperature signal received from the temperature sensor 68. When the temperature difference ΔT between the temperature T at the recovery operation and the temperature at the check mode driving stored in the flash memory 84 is equal to or less than a threshold value, the recovery operation is set based on the first failure-nozzle data and the recovery operation is executed. In other words, it is not necessary to execute the check mode driving immediately before the recovery operation so the recovery operation is quickly completed.

Figure 10:
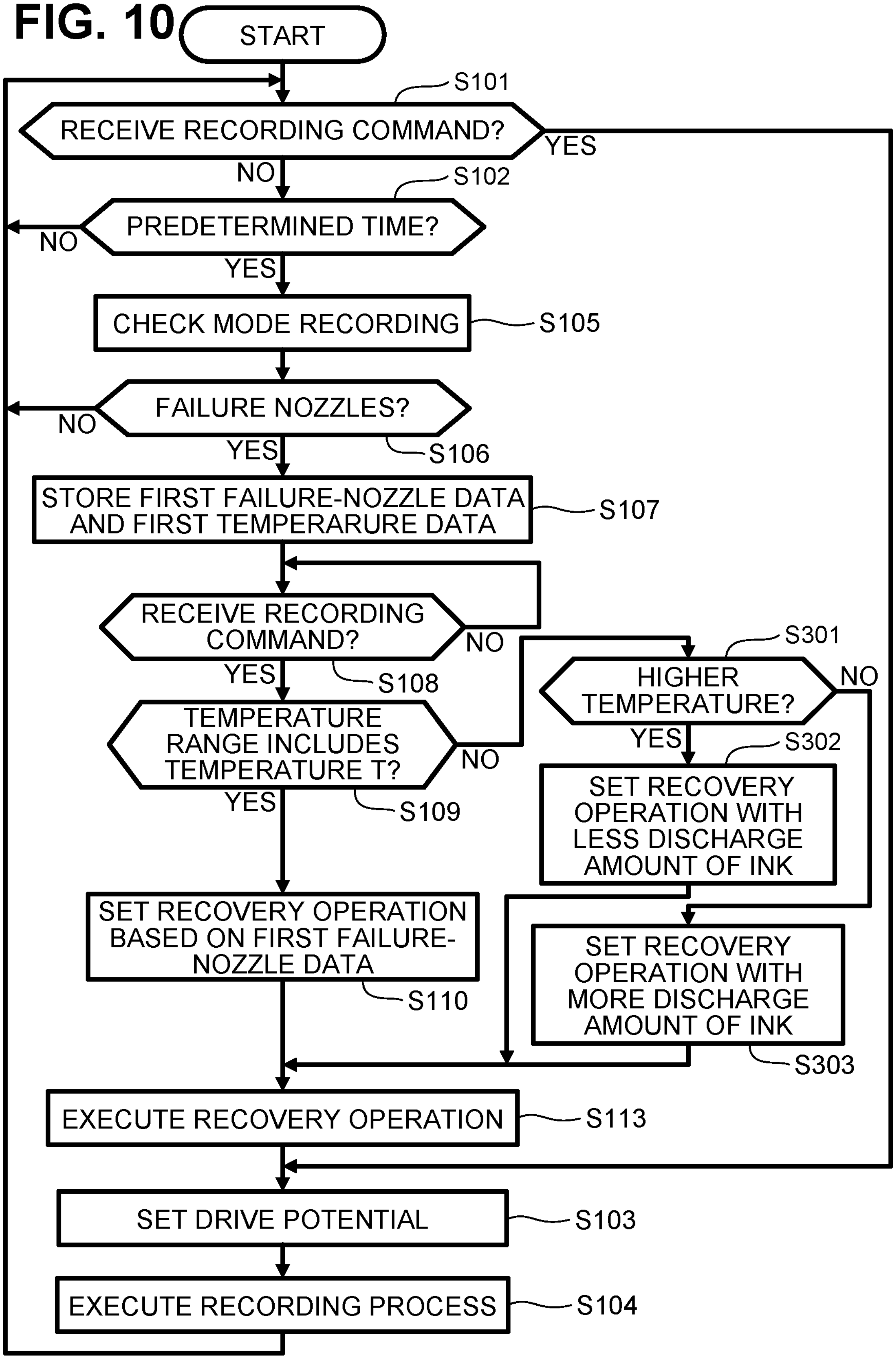
FIG. 10 is a flowchart showing the processing by the controller according to the second modification.

In the second modification, the controller 80 controls the printer 1 by performing processing along the flowchart of FIG. 10. S301, S302 and S303 in the flowchart of FIG. 10 are replacements for S111 and S112 in the flowchart of FIG. 7.

In the second modification, if the controller 80 determines in S109 that the temperature T indicated by the temperature signal received from the temperature sensor 68 is not in the temperature range indicated by the first temperature data that is stored in the flash memory 84 in S107 (S109: NO), the controller 80 determines whether or not the temperature T is higher than the temperature at the check mode driving (S301). If the temperature T is higher than the temperature at the check mode driving (S301: YES), a recovery operation in which the discharge amount of ink is less than the discharge amount of ink in the recovery operation based on the first failure-nozzle data is set (S302), and the process proceeds to S113.

If the temperature T is lower than the temperature at the check mode driving (S301: NO), a recovery operation in which the discharge amount of ink is greater than the discharge amount of ink in the recovery operation based on the first failure-nozzle data is set (S302), and the process proceeds to S113.

In general, when the temperature increases, the viscosity of the ink decreases. In the second modification, when the temperature rises significantly after the check mode driving until the recovery operation is performed, the recovery operation with less ink discharge is performed than when the temperature does not change.

On the other hand, when the temperature decreases, the viscosity of the ink increases. In the second modification, when the temperature decreases significantly until the recovery operation is performed after the check mode driving, the recovery operation with more ink discharge is performed than when the temperature does not change. Therefore, even when the temperature changes largely after the check mode driving, the recovery operation suitable for the nozzle condition is performed.

In the third modification, a recovery operation corresponding to the failure-nozzle data stored most recently in the flash memory 84 is performed.

Figure 11:
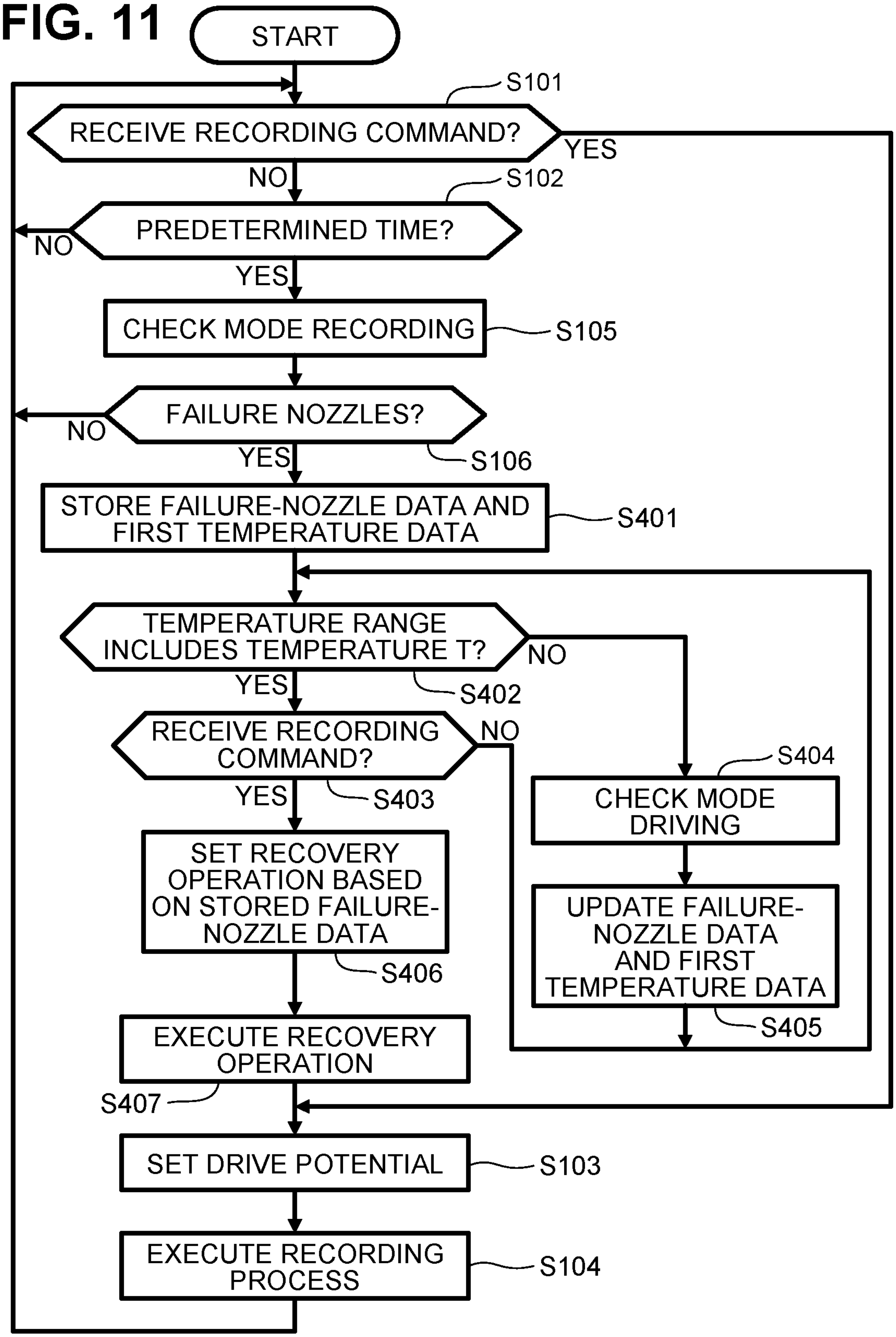
FIG. 11 is a flowchart showing processing by the controller according to the third modification.

The controller 80 of the third modification performs processing to control the printer 1 in accordance with the flowchart of FIG. 11. The controller 80 performs processing of S101, S102, S103, S104, S105 and S106 in the same manner as in the present embodiment. When the controller 80 determines in S106 that a failure nozzle exists (S106: YES), the controller 80 stores the failure-nozzle data and the first temperature data in the flash memory 84 (S401). The failure-nozzle data identifies the nozzle 10, i.e., the failure nozzle, in which a failure has occurred, and includes the number N of failure nozzles, based on the determination signal received during the check mode driving.

Then, in S402, the controller 80 determines whether or not the temperature T indicated by the temperature signals received from the temperature sensors 68 is in the temperature range indicated by the first temperature data stored in the flash memory 84. More specifically, the controller 80 determines which temperature range defined in the table shown in FIG. 8A includes the temperature T indicated by the temperature signals received from the temperature sensors 68. Next, the controller 80 determines whether or not the determined temperature range matches the temperature range indicated by the first temperature data that is stored in the flash memory 84 in S107. If it matches (S402: YES), the controller 80 determines in S403 whether or not a recording command has been received. While the recording command has not been received (S403: NO), the processing proceeds to S402.

When the temperature T indicated by the temperature signal received from the temperature sensor 68 is not in the temperature range indicated by the first temperature data stored in the flash memory 84 (S402: NO), the controller 80 executes the check mode driving (S404). In S404, the controller 80 drives the inkjet head 4 in a state where the carriage 2 is in the maintenance position to eject ink sequentially from each of the nozzles 10 toward the detection electrode 76. The controller 80 receives a determination signal from the determination circuit 78 for each of the nozzles 10.

Subsequently, the failure-nozzle data and the first temperature data stored in the flash memory 84 are updated (S405), and the processing proceeds to S402. The failure-nozzle data identifies the nozzle 10, i.e., the failure nozzle, in which a failure has occurred, and includes the number N of failure nozzles, based on the determination signal received during the check mode driving. The first temperature data is based on the temperature signal received from the temperature sensor 68 during the check mode driving. The first temperature data may be about the temperature itself indicated by the temperature signal. The first temperature data may alternatively indicate that the temperature indicated by the temperature signal is included in one of the temperature ranges in FIG. 8A.

When the controller 80 receives a recording command (S403: YES), the controller 80 sets a recovery operation on the basis of the number N of failure nozzles included in the failure-nozzle data and the table in FIG. 8B (S406). The controller 80 then executes the recovery operation set in S406 (S407). After the recovery operation, in S103 the controller 80 sets a drive potential to be applied to the drive electrode 64, and executes a recording process in S104.

In the third modification, after the failure-nozzle data is stored in the flash memory 84 on the basis of the determination signal output from the determination circuit 78 during the check mode driving, the check mode driving is executed every time the temperature T is not in the temperature range indicated by the first temperature data stored in the flash memory 84 before the recovery operation is executed, and the failure-nozzle data stored in the flash memory 84 is updated on the basis of the determination signal output from the determination circuit 78. Thus, the controller 80 executes the recovery operation set on the basis of the failure-nozzle data stored most recently in the flash memory 84.

In S402, as in S201 described above, the controller 80 may determine whether or not the temperature difference ΔT between the temperature T indicated by the temperature signal received from the temperature sensor 68 and the temperature indicated by the first temperature data that is stored in the flash memory 84 in S107 is equal to or less than the threshold value ΔTh. In this case, whenever the temperature difference ΔT exceeds the threshold value ΔTh, the controller 80 executes the check mode driving in S405 to update the failure-nozzle data and the first temperature data stored in the flash memory 84.

According to the third modification, no matter how the temperature T changes after the first check mode driving, the recovery operation suitable for the nozzle condition is performed.

In the fourth modification, a table shown in FIG. 12 is stored in the flash memory 84 in which a temperature range of the temperature T indicated by the temperature signal received from the temperature sensor 68 is associated with a drive waveform of the drive signal to be transmitted from the driver IC 89 to the individual electrode 64. The temperature range and the drive waveform are associated with each other in accordance with the relationship between the temperature of the ink and the viscosity of the ink, in the inkjet head 4. The potential of the individual electrode 64 is switched between the ground potential and the drive potential according to the drive waveform.

As shown in the table in FIG. 12, the drive waveform is W4 when $T3 \le T$. The drive waveform is W3 when $T2 \le T < T3$. The drive waveform is W2 when $T1 \le T < T2$. The drive waveform is W1 when $T < T1$. T1, T2, and T3 satisfy the inequality of $T1 < T2 < T3$. The drive waveforms W1, W2, W3 and W4 in FIG. 12 are pulse waveforms. The drive waveform W1 has its unique pulse width, number of pulses, and pulse interval, one or more of which is different from those of other waveforms. Similarly, each of drive waveforms W2, W3 and W4 has its unique pulse width, number of pulses, and pulse interval.

The amount of ink ejected from the nozzle 10 when the drive waveform W1 is applied to the individual electrode 64 is greater than the amount of ink ejected from the nozzle 10 when the drive waveform W2 is applied to the individual electrode 64. The amount of ink ejected from the nozzle 10 when the drive waveform W2 is applied to the individual electrode 64 is greater than the amount of ink ejected from the nozzle 10 when the drive waveform W3 is applied to the individual electrode 64. The amount of ink ejected from the nozzle 10 when the drive waveform W3 is applied to the individual electrode 64 is greater than the amount of ink ejected from the nozzle 10 when the drive waveform W4 is applied to the individual electrode 64.

In the fourth modification, the determination in S109 is performed using the temperature range shown in the table of FIG. 12 to determine the drive waveform to be applied to the individual electrode 64. Since the individual electrode 64 is driven according to the drive waveform corresponding to the temperature range, the nozzle condition can be appropriately recovered rather than controlling the drive of the individual electrode 64 according to only the drive potential.

Other Modifications

When the printer 1 supports recording at low image quality and recording at high image quality, and when it is determined that the first received recording instruction is for recording at high image quality after the check mode driving in S105, S109 may be executed. When a recording instruction for recording at low image quality is received before receiving a recording instruction for recording at high image quality, recording processing may be executed without obtaining a temperature signal from the temperature sensor 68.

When the controller 80 receives a signal other than the recording command, S109 may be executed. The signal other than the recording command may be, for example, an ON signal indicating that the power of the printer 1 is turned ON after driving in the check mode.

After receiving a time signal indicating that the time is a predetermined time and executing the check mode driving, the recovery operation may be executed after performing an operation which requires a certain amount of time other than the recovery operation. In this case, when a large temperature change occurs during the execution of such operation, the controller 80 may execute another recovery operation other than the recovery operation based on the first failure-nozzle data stored in the flash memory 84.

The execution timing of the check mode driving may be when a predetermined time has elapsed from the latest recording or when a predetermined time has elapsed from the latest check mode driving.

As a type of the recovery operation, only a plurality of types of the suction purge in which ink discharge amounts are different may be used, and the flushing may be excluded. As a type of the recovery operation, only a plurality of types of the flushing in which ink discharge amounts are different may be used, and the suction purge may be excluded.

Instead of the suction purge, a pressure purge may be performed by providing a pressure pump in the middle portion of the tube 15 connecting the sub-tank 3 and the ink cartridge 14, and driving the pressure pump while the nozzles 10 are covered with the cap 71, whereby the ink in the inkjet head 4 is pressurized and discharged from the nozzles 10.

Both suction by the suction pump 72 and pressurization by the pressurization pump may be performed.

The check mode driving may be executed for some nozzles 10 of the inkjet head 4, for example, every other nozzle 10 in each nozzle row 9. Then it may be estimated whether or not the other nozzles 10 are failure nozzles on the basis of a determination signal output from the determination circuit 78 during the check mode driving.

In order to determine whether or not the nozzle 10 is a failure nozzle, a detection electrode extending in the vertical direction may be used. By detecting a change in the potential of the detection electrode when the ink discharged from the nozzle 10 passes through a region in the vicinity of the detection electrode, a failure nozzle may be determined.

Alternatively, by detecting an output change from a light-receiving portion due to the ink ejected from the nozzle 10 crossing the light emitted by a light source of the optical sensor, a failure nozzle may be determined.

Alternatively, as described in Japanese Patent No. 4929699, a voltage detection circuit for detecting a change in voltage when ink is ejected from the nozzle 10 may be connected to the plate 31 on which the nozzle 10 of the inkjet head 4 is formed, Thus, a failure nozzle may be determined based on a signal output from the voltage detection circuit to the controller 80.

Alternatively, as described in Japanese Patent No. 6231759, the inkjet head 4 may include a temperature sensor element. After a first voltage is applied to drive a heater to eject ink, a second voltage is applied to drive the heater so that ink is not ejected. Then, a failure nozzle may be determined based on a change in temperature detected by the temperature sensor element during a period until a predetermined time elapses after the second voltage is applied.

A signal output unit that outputs signals corresponding to the state of the abnormal nozzle may be provided so information on the state of the failure nozzle may be acquired on the basis of the signals from the signal output unit. The state of the failure nozzle includes an abnormality in the ink ejection direction, ink spray, air bubbles in ink, clogging of paper powder, and the like. A recovery operation may be performed based on information on the state of the failure nozzle. A recovery operation may be performed based on information including both the number of failure nozzles and the state of the failure nozzle.

The present disclosure may be applied to a printer having a so-called line head extending in the scanning direction.

The present disclosure may be applied to a printer that records images on a recording medium such as a T-shirt, a sheet for outdoor advertisement, a jacket for a portable terminal such as a smartphone, a corrugated board, or a resin member.

The present disclosure may be applied to an apparatus for discharging liquid resin or metal.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A liquid ejection apparatus comprising:
a liquid ejection head having a nozzle;
a first circuit configured to output a determination signal indicating that ejecting liquid in a check mode from the nozzle is in failure;
a second circuit configured to output a temperature signal indicating a temperature;
a recovery device configured to perform a recovery operation, to discharge liquid from the nozzle;
a memory; and
a controller configured to:
drive the liquid ejection head in the check mode to eject liquid from the nozzle;
in response to receiving from the first circuit a first determination signal in the check mode, store first failure-nozzle data in the memory, the first failure-nozzle data being related to the first determination signal;
receive from the second circuit a first temperature signal indicating a first temperature during the check mode;
receive from the second circuit a second temperature signal indicating a second temperature during the check mode;
determine whether the first temperature and the second temperature satisfy a predetermined condition; and
in response to determining that the first temperature and the second temperature satisfy the predetermined condition, cause the recovery device to perform a first recovery operation based on the first failure-nozzle data stored in the check mode.

2. The liquid ejection apparatus according to claim 1, wherein
the controller determines that the first temperature and the second temperature satisfy the predetermined condition in a case where a difference between the first temperature and the second temperature is less than a particular threshold.

3. The liquid ejection apparatus according to claim 2, wherein
the controller is further configured to:
in a case where the difference is not less than the particular threshold, drive the liquid ejection head in the check mode to eject liquid from the nozzle;
in response to receiving from the first circuit a second determination signal, store second failure-nozzle data in the memory, the second failure-nozzle data being related to the second determination signal; and
cause the recovery device to perform a second recovery operation based on the second failure-nozzle data.

4. The liquid ejection apparatus according to claim 2, wherein
the controller is further configured to:
in a case where the difference is not less than the particular threshold and the second temperature is higher than the first temperature, cause the recovery device to perform a second recovery operation, an amount of liquid discharged in the second recovery operation being less than an amount of liquid discharged in the first recovery operation.

5. The liquid ejection apparatus according to claim 4, wherein
the controller is further configured to:
in a case where the difference is not less than the particular threshold and the second temperature is lower than the first temperature, cause the recovery device to perform a third recovery operation, an amount of liquid discharged in the third recovery operation being greater than an amount of liquid discharged in the first recovery operation.

6. The liquid ejection apparatus according to claim 2, wherein
the controller is further configured to:
in a case where the difference is not less than the particular threshold and the second temperature is lower than the first temperature, cause the recovery device to perform a second recovery operation, an amount of liquid discharged in the second recovery operation being greater than an amount of liquid discharged in the first recovery operation.

7. The liquid ejection apparatus according to claim 1, wherein
the memory stores a table representing a relationship of temperature ranges and potentials to be applied to the liquid ejection head.

8. The liquid ejection apparatus according to claim 7, wherein
the controller is further configured to:
determine that the first temperature is in a first temperature range;
determine whether the second temperature is in the first temperature range,
in response to determining that the second temperature is in the first temperature range, determine that the first temperature and the second temperature satisfy the predetermined condition.

9. The liquid ejection apparatus according to claim 7, wherein
the liquid ejection head comprises:
plates that define a pressure chamber communicating the nozzle;
an electrode;
a driver IC connected to the electrode,
the controller is further configured to:
control the driver IC to apply a drive potential to the electrode to deform the pressure chamber, the drive potential being determined based on the table and the first temperature.

10. The liquid ejection apparatus according to claim 1, wherein
the memory stores a table representing a relationship of temperature ranges and waveforms to be applied to the liquid ejection head.

11. The liquid ejection apparatus according to claim 10, wherein
the liquid ejection head comprises:
plates that define a pressure chamber communicating the nozzle;
an electrode;
a driver IC connected to the electrode,
the controller is further configured to:
control the driver IC to apply a drive waveform to the electrode to deform the pressure chamber, the drive waveform being determined based on the table and the first temperature.

12. The liquid ejection apparatus according to claim 1, further comprising:

a clock unit configured to output a time signal indicating current time, wherein the controller is further configured to:

drive the liquid ejection head in the check mode when the current time indicated by the time signal is a predetermined time.

13. The liquid ejection apparatus according to claim 1, wherein the recovery device includes a pump for suctioning liquid from the nozzle.

* * * * *